(No Model.)
M. L. FOGEL.
TAG HOLDER AND TAG.
No. 399,395. Patented Mar. 12, 1889.
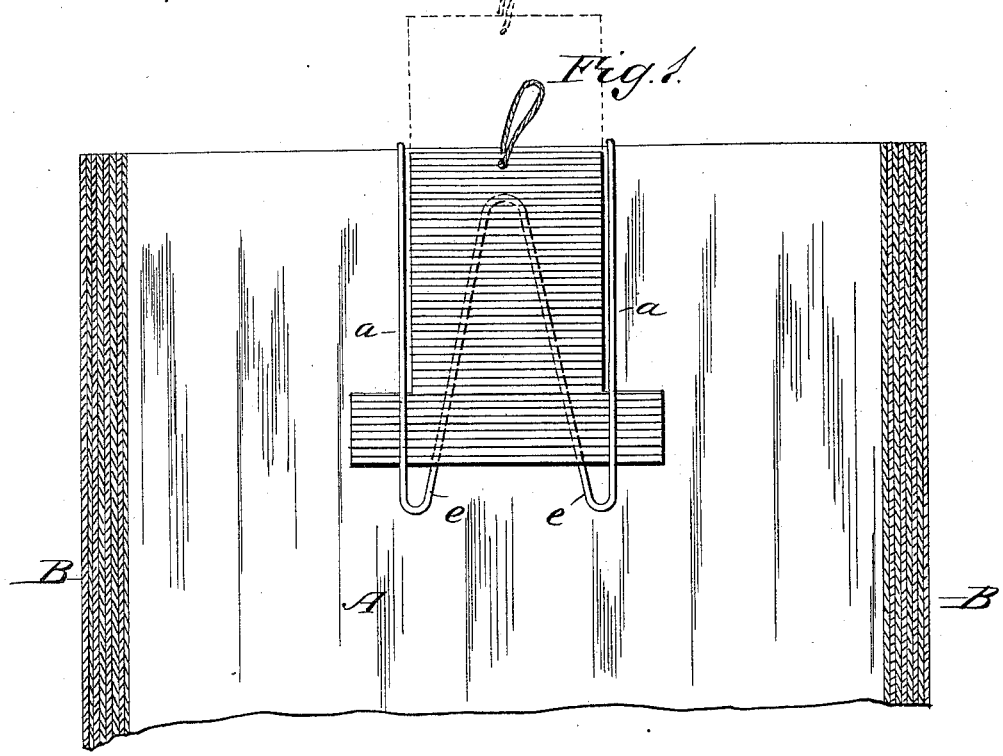
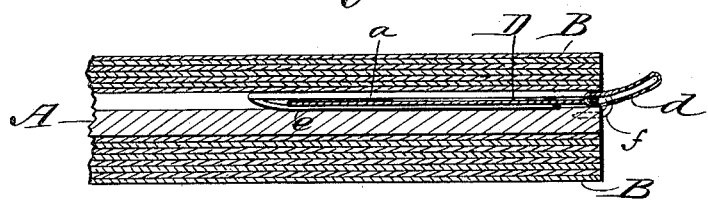
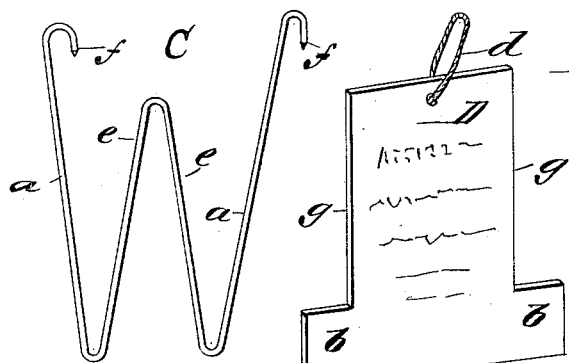
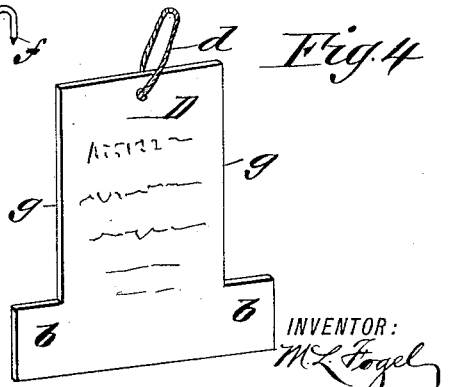
WITNESSES:
F. McArdle.
C. Sedgwick
INVENTOR:
M. L. Fogel
BY
ATTORNEYS.

UNITED STATES PATENT OFFICE.

MARTIN L. FOGEL, OF SUPERIOR, NEBRASKA.

TAG-HOLDER AND TAG.

SPECIFICATION forming part of Letters Patent No. 399,395, dated March 12, 1889.

Application filed October 29, 1888. Serial No. 289,388. (No model.)

*To all whom it may concern:*

Be it known that I, MARTIN L. FOGEL, of Superior, in the county of Nuckolls and State of Nebraska, have invented a new and useful Improvement in Tag-Holders and Tags, of which the following is a full, clear, and exact description.

My invention has for its object the production of a tag-holder and tag adapted to be readily attached to and detached from packages of goods to be marked without injury to the goods, which shall securely remain upon the package until the package is consumed, without liability to injury from ordinary causes, and which will permit of easy access to the tag for the purpose of reading the same. I accomplish this by combining with a winged tag a W-shaped tag-holder provided with means of attachment to the package to be marked.

Reference is to be had to the accompanying drawings, forming a part of this specification, in which similar letters of reference indicate corresponding parts in all the figures.

Figure 1 is a front view of my improved tag-holder and tag in place upon the core-piece of a package of goods. Fig. 2 is a section through a package of goods, its core-piece, and tag, showing the manner of attaching my improved tag-holder to the core-piece and the relationship of the arms of the tag-holder to the tag. Fig. 3 is perspective view of the tag-holder detached, and Fig. 4 is a face view of the tag detached.

In the drawings, A is the core-piece upon which a length of fabric is wound, and B is the fabric wound thereon. This core-piece is usually made of wood.

C is the tag-holder, made, preferably, of wire bent in the same plane into the form of a W, having its outer arms, $a$ $a$, at their upper extremity bent over and pointed, as at $f\,f$ in the drawings, to provide a means of attaching the holder to the core-piece and to serve as stops to prevent the tag from being wholly withdrawn from the holder.

D is the tag, preferably made of stiff cardboard with straight sides $g\,g$, and provided with lateral extensions or wings $b\,b$ at a point preferably below where the necessary information the tag contains ceases and at its upper end with a loop, $d$, of cord or other material.

The manner of combining the tag and holder is shown in Figs. 1 and 2 of the drawings, where it will be observed that the wings $b\,b$ of the tag are in position between the outer arms, $a\,a$, of the tag-holder and the inner arms, $e\,e$. The arms of the tag-holder press against said tag sufficiently to prevent the tag from falling from the holder sidewise. This pressure is occasioned by the tendency of the arms $a\,a$ and $e\,e$ to resume their normal plane, from which they have been forced by the tag inserted between them. It will also be observed that in Fig. 1 the outer arms, $a\,a$, of the tag-holder have been brought into line parallel with the sides of the tag, the body of the tag being of less width above the wings than the distance between the outer arms of the holder, and thus the outer arms of the holder serve to guide and retain the tag in place in its movements.

When one of my tag-holders and tags combined in the manner just described has been secured to the core-piece of a roll of fabric, by driving the bent portions at $f\,f$ into the same, the tag may readily and freely be withdrawn from the pocket formed between the fabric and the core-piece a sufficient distance to be read, because the arms of the holder, while preventing the fabric or core-piece from impeding the movement of the tag, do not themselves press so tightly upon the tag as to interfere with its movements. Thus it will be seen the tag and tag-holder may be pocketed and out of harm's way between the fabric and core-piece, when not needed; but when the tag is needed it can be readily and quickly brought to view.

The upper bent portion, $f\,f$, of the arms $a\,a$ serves to prevent the tag from being withdrawn from its holder accidentally, as in such case the upper edge of the wings $b\,b$ of the tag would come in contact with the bent portion of said arms, and thereby be prevented from further outward movement.

The loop $d$ may be used or not, as desired. When used, it serves as a convenient pull for the tag.

Of course the tag-holder can be used over and over again until worn out.

Having thus fully described my invention, I claim as new and desire to secure by Letters Patent—

1. The combination, with a tag provided with wings, of a tag-holder of substantially a W shape, the wings of said tag entering between the inner and outer arms of the W-shaped tag-holder, and the outer arms being provided with penetrating-points, substantially as specified.

2. A tag-holder formed of wire bent in the same plane, comprising the outer arms, $a\ a$, and the inner arms, $e\ e$, said inner arms approaching each other, and said outer arms having formed therewith the penetrating-points $f\ f$, substantially as specified.

MARTIN L. FOGEL.

Witnesses:
S. B. ADAMS,
D. BOSSERMAN.